C. H. SMOOT.
FLUID CONTROL VALVE.
APPLICATION FILED MAR. 25, 1918.
1,322,207.
Patented Nov. 18, 1919.
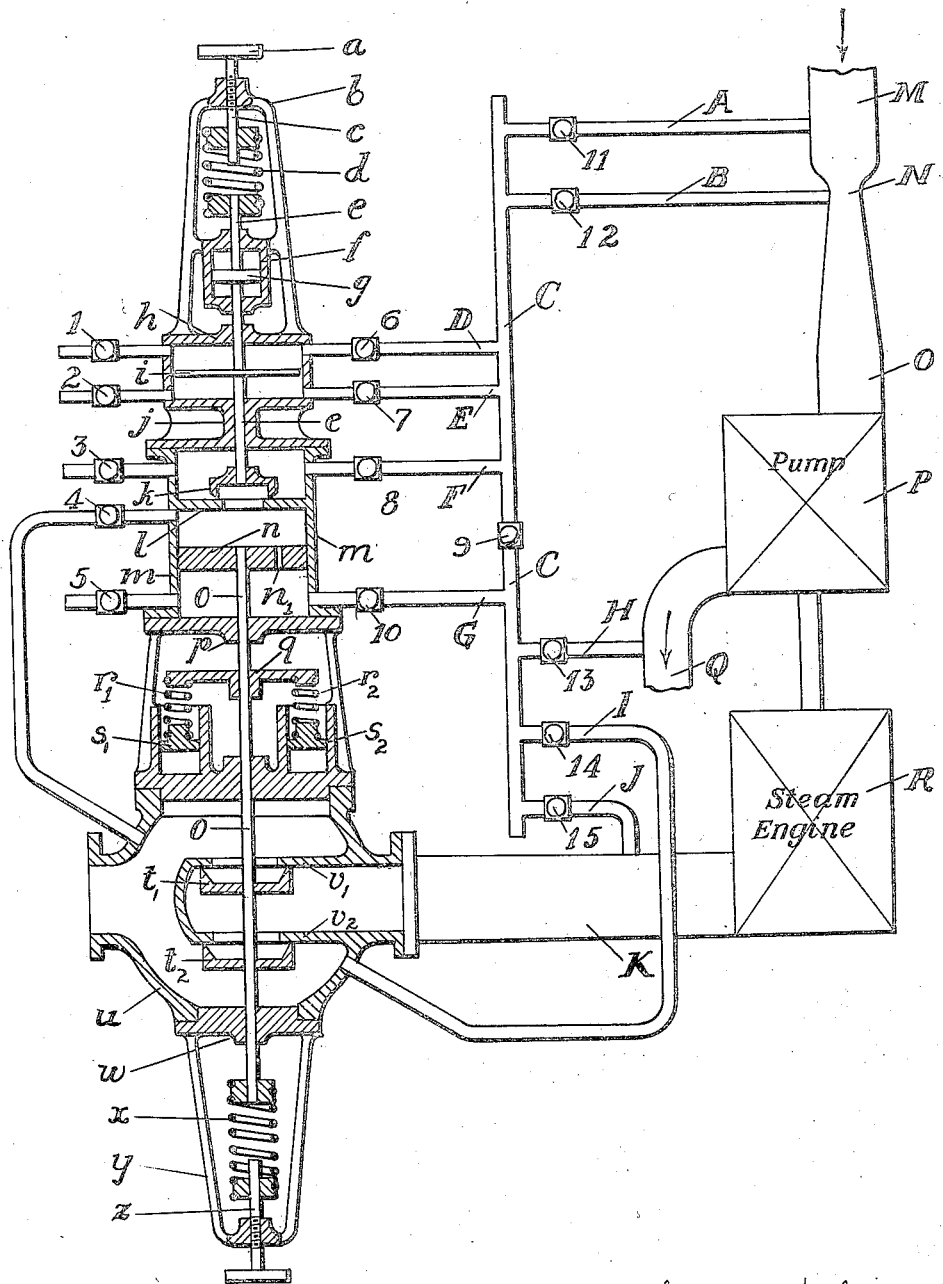
Charles H. Smoot,
INVENTOR.
BY Knight Bros.
his ATTORNEYS

UNITED STATES PATENT OFFICE.

CHARLES H. SMOOT, OF SOUTH ORANGE, NEW JERSEY, ASSIGNOR TO RATEAU BATTU SMOOT ENGINEERING CORPORATION, OF NEW YORK, N. Y., A CORPORATION OF DELAWARE.

FLUID-CONTROL VALVE.

1,322,207.   Specification of Letters Patent.   Patented Nov. 18, 1919.

Application filed March 25, 1918. Serial No. 224,622.

*To all whom it may concern:*

Be it known that I, CHARLES H. SMOOT, a citizen of the United States, residing in South Orange, in the county of Essex and State of New Jersey, have invented certain new and useful Improvements in Fluid-Control Valves, of which the following is a full and clear specification.

My invention relates in general to the regulation of pressure or volume of gases and more particularly to the automatic maintenance of a uniform pressure or volume in a moving body of gas.

An important object of the invention is to confine the variations in pressure or volume to a comparatively small range, and to effect the regulation smoothly, but positively, so that the most exacting technical requirements in systems calling for accuracy in the gas supply can be fulfilled.

Another important object of the invention is to provide a regulator capable of handling large quantities of gas with the same delicacy and accuracy as obtained in the regulation of comparatively small quantities. The invention involves the use of a pressure responsive regulating element whose movement from an assumed normal position to effect regulation, is opposed by an adjustable resilient means exerting against it a cumulative force proportional to its travel and giving it the desired regulation characteristic. The motive force to actuate this regulating element is supplied in the form of a moving body of gas which has restricted passageway from one side of the element to the other and an automatically controlled outlet at one side, by which the pressure difference between the two sides is modified for causing movement of the regulating element. The valve for controlling this outlet is in the form of a puppet valve, and one of the essential features of the invention resides in applying pressure or velocity head of the gas current to maintain the puppet valve normally off its seat, whereby the current of gas may flow continuously through the apparatus. The puppet valve is also under the influence of an adjustable resilient means applying a cumulative force by which the regulation is provided.

I shall describe the invention with reference to a pressure regulator which can be arranged to give a sensitive and accurate pressure and volume regulation for any selected one of several different conditions, without changing the apparatus, other than in the opening and closing of the hand valves.

The drawing illustrates, in vertical section, and partly diagrammatic a regulator system of the character mentioned.

The regulator illustrated in the drawing comprises a valve $u$ to be controlled, the piston $n$ for operating the valve $u$, and a sensitive pressure valve $k$ controlling the motion of piston $n$. A hand wheel $a$ is mounted on a threaded rod $c$ which is engaged in a threaded portion of the yoke $b$. A spring $d$ is at one end connected by a swivel to the end of threaded rod $c$ and at its other end by a swivel to the valve rod $e$. A dash pot cylinder $f$ has operating within it a piston $g$ which is attached to valve rod $e$, the cylinder $f$ being supported in position by the yoke $b$. Another cylinder $h$ has operating within it a piston $i$, which is attached to the valve rod $e$. $j$ represents a gland separating the pressure within the cylinder $h$ from the pressure within the cylinder $m$. The valve $k$ above referred to is in the form of a puppet valve attached to valve rod $i$ and provided with a sharp edge where it closes on its seat $l$ in the upper portion of cylinder $m$. The cylinder $m$ has operating within it a piston $n$ above referred to, which is attached to piston rod $o$. This cylinder $m$ may be termed the metering cylinder, while the piston $n$ may be termed the pressure responsive regulating element. The piston $n$ has a by-pass $n_1$ by which restricted communication is maintained between the chambers at the two sides of the piston. A cross bar or rod $q$ is fixed on rod $o$ and at either end is connected through springs $r_1$ $r_2$ with dash pot pistons $s_1$ $s_2$ operating in cylinders which are mounted over valve housing $u$. The valve heads $t_1$ $t_2$ are attached to a rod $o$ and constitute a balance valve with seats $v_1$ $v_2$ respectively and all inclosed within valve housing $u$. The rod $o$ passes through the gland $w$ mounted in the lower portion of valve housing $u$. To the lower portion of rod $o$ is secured a coil spring $x$, whose compression or extension may be adjusted by means of the threaded rod $z$ mounted in yoke $y$.

1 to 15 inclusive comprises hand valves for opening or closing the respective pipes in which they are located. Valves 1, 2, 3 and 5 open to atmosphere.

A to J inclusive, denote pipes by means of which pressure may be communicated to cylinders $h$ and $m$ by opening and closing the proper hand valves as may be desired. K represents a steam pipe, admission to which is controlled by valves $t_1$ $t_2$ under the influence of the pressure responsive regulating element, piston $n$. The steam pipe K leads to steam engine R which drives pump P. M is a suction line provided with Venturi element N connecting through pipe O to the pump P. Q is a discharge or pressure pipe line from pump P.

Pressure difference to vary the position of piston $n$, as will be shown, may be supplied in either one of two ways. First, by letting a current of gas enter below piston $n$ and escape restrictedly through it or around it into the space above; or second by letting a current of gas enter above piston $n$ through the hand valve 4 and opening the space below to atmosphere. In the first case, the preponderance of gas pressure is always necessarily below the piston $n$, tending to raise the piston $n$ and close valves $t_1$ $t_2$. Spring $x$ must therefore be set so that piston $n$ tends normally to open, due to tension of spring $x$ or insufficient compression of spring $x$ to entirely support the weight of piston $n$ and connected parts. In the second case, preponderance of gas pressure is always necessarily above piston $n$, tending to lower it, and spring $x$ must be set for compression tending to raise the piston $n$ and close valves $t_1$ $t_2$.

With the apparatus described, a constant pressure of considerable magnitude in pipe Q will be obtained and regulated by opening the hand valves 13, 10, 3, 2 and 1, all of the other hand valves remaining closed. The opening of hand valves 1 and 2 eliminates piston $i$ from action. Under this condition, the pressure of discharge from pump P, which is to be regulated is communicated through pipe C and pipe G to the lower portion of cylinder $m$ where it exerts a lifting pressure on piston $n$ which pressure is opposed by the spring $x$ and weight of piston with connected parts, acting in conjunction with a pressure within cylinder $m$ above the piston $n$. The pressure above piston $n$ is caused by a restricted flow of fluid through by-pass $n_1$ and is limited by the extent to which the unbalanced valve $k$ is held off its seat and thus allows the gas to escape. Valve $k$ and spring $d$, thus determine the regulation for a constant pressure above piston $n$, subject to control by the adjustment of spring $d$, which controls the pressure on top of piston $n$ and therefore determines in conjunction with spring $x$ the pressure of equilibrium in pipe Q. The spring $x$ has a characteristic such that it requires a slightly increased pressure in pipe Q for no load position, corresponding to the valves $t_1$ $t_2$ being closed and gives the desired characteristic or difference in pressure in pipe Q between no load and full load. With the parts in the positions assumed, a current of gas flows into the cylinder $m$ below piston $n$ and through the restricted passage way $n_1$ into the space at the other side of piston $n$ and escapes through the outlet controlled by puppet valve $k$ which is held off its seat a distance determined by the pressure or velocity head of the moving body of gas.

The operation above described represents a principle common to all forms of the invention and this principle may be extended to a system in which the control or regulating effect is compounded. Where, for example, the pressure differences to be controlled are relatively small, so that they might perhaps lack the desired operating force, these pressure differences may be applied to a piston of larger area than the valve $k$, fixed on the same valve rod, so that the lifting effect exerted by the pressure variations is multiplied. The piston $i$ in cylinder $h$ represents such an element. Assuming, for instance, that the pressure at Q is to be regulated for very small values all of the hand valves are closed, with the exception of 13, 9, 7, 1, 3, 4 and 5, which are open, the valve 4 being open but a slight amount, so that a small flow of steam from valve chamber $u$ flows through valve 4 and into the space above piston $n$. A small portion of this steam flows through the restricted passage $n_1$ into the space below piston $n$, and escapes through hand valve 5 to the atmosphere. The major portion of the steam which enters the cylinder $m$ through hand valve 4 escapes through unbalanced valve $k$ and reaches atmosphere through the open valve 3. The pressure above piston $n$ is exerted on unbalanced valve $k$ to give a lifting action, which lifting action is opposed by the spring $d$, as before, and assisted by the pressure in pipe Q acting through valve 13, pipes H and C, valve 9, pipe E and valve 7, from which it is communicated to the under side of piston $i$ while atmospheric pressure is maintained above piston $i$ through the opening of hand valve $l$. The area of piston $i$ being much greater than the area of the valve $k$ a small pressure change on piston $i$, through lifting or lowering valve $k$ produces a much larger pressure change below valve $k$ and on top of piston $n$. Thus, in cylinder $m$ there are produced by the flow of steam through unbalanced valve $k$ much greater variations in pressure than occur in pipe Q. The areas of piston $i$ and valve $k$ are, of course, in a fixed ratio and when the forces on rod $e$ are equalized, the pressure changes below valve $k$ are equal to the variations of pressure on piston $i$, multiplied by the area ratio of piston $i$ to valve $k$. An increase of pressure in Q produces a proportionate decrease of pressure on top of piston $n$, which, in turn permits the spring $x$ to lift rod $o$ and piston $n$ and reduce the admission of steam into pipe K. A decrease in the pressure of pipe Q reversing the action, opens valve $t_1$ $t_2$, allows more steam to enter the engine R which thus causes the pump P to deliver a greater volume of fluid through pipe Q whereby the pressure is restored to its original value.

Obviously, this compounding effect can be carried further under the same principle but it is not believed necessary to describe the same in detail.

It will be observed that the relief valve $k$, is normally always open and exposed to the operating fluid in such manner that the pressure of the operating fluid tends to open the relief valve. Thus when the pressure of the operating fluid builds up, due to its escape occuring at a lesser rate than its admission, it tends to open the relief valve wider and in so doing, increases the rate of escape. This action coöperates with the opposing pressure to lead naturally and smoothly to a position of equilibrium of the opposed forces which influence the movement of the relief valve. If the change of pressure of the operating fluid be represented by $P_1$ whereas the change of opposing pressure tending to close the relief valve be represented by $P_2$, obviously equilibrium is reached when $P_1 = P_2$. Where the multiplication of the control is effected by the use of piston $i$, the equation of equilibrium would be represented by $P_1$ X. Constant equals $P_2$, the constant being the ratio of the area of piston $i$ to the area of relief valve $k$.

Having explained the principle of operation of the simple and compound systems, their application to other pressures or to volumes which it is desired to control, will be readily apparent. It will also be readily understood that suction may be regulated by a kind of reversal of the functions described.

When it is desired to regulate for a large constant suction in pipe M prior to entry into pump P, all of the hand valves 1 to 15 inclusive, with the exception of 11, 8, 5, 1 and 2 are closed. The opening of valves 1 and 2 to atmosphere equalizes the pressure difference across piston $i$ to prevent its acting on the regulation. The suction in M, through pipes A, C and F acts above unbalanced valve $k$, tending to lift it from its seat. The suction passes the valve and acts on top of piston $n$, controlling the admission of steam into pipe K. If the spring $d$ is depressed by hand wheel $a$, the pressure drop across unbalanced valve $k$ is increased, but remains practically constant for a fixed spring position, owing to the small travel necessary for valve $k$ to pass whatever air may enter through valve 5 and pass through piston $n$, as leakage around the outside and through the restricted passageway $n_1$. It will be seen that a balance is obtained between the lifting action of suction above piston $n$ and falling action of the weight of piston $n$ with its connected rod and valves and the action of spring $x$, which balance is subject to hand adjustment by spring $d$. An increasing suction in pipe N produced by an increased volume of fluid through pump P results in reducing the admission of steam to pipe K and engine R and causing pump P to reduce the volume handled whereby the suction in pipe M is restored to its normal value.

When it is desired to maintain a very small suction in pipe M, whose difference from atmospheric pressure is slight, valves 1 to 15, inclusive, are all closed with the exception of 11, 6, 2, 3, 4, and 5. Valve 4 is slightly open, permitting small flow of steam from the pressure side of valve chamber $u$, to enter cylinder $m$, whence it escapes through unbalanced valve $k$ and to atmosphere through valve 3. As in the case of regulation for small pressures, the steam pressure maintained above piston $n$ is determined by the downward force acting on valve $k$, which finds its origin in the compression of spring $d$, reduced by the lifting action on piston $i$ of the suction in pipe M. In consequence of this, any variations in suction in pipe M are multiplied and reproduced in cylinder $m$ above the piston $n$. By this means I produce a multiplied metering pressure whose variations are in proportion to those to be regulated in pipe M.

The spring $x$ is compressed to overcome the weight of piston $n$ and its connected parts and give a closing action to valve $u$. The pressure above piston $n$ gives the opening action to valve $u$. If the suction in pipe M exceeds the normal value as determined by the compression of springs $d$ and $x$, the downward pressure on piston $n$ is reduced and a closing action produced in valve $u$, which, in turn causes pump P to draw a reduced volume from pipe M thereby reducing the suction and restoring it to normal value.

For maintaining a large constant volume of fluid, hand valves 1 to 15 are closed, excepting valves 12, 8, 5, 1 and 2. This eliminates piston $i$ from operation and places the upper portion of cylinder $m$ above the unbalanced valve $k$, in communication with the throat of the Venturi element N at which point the depression is in proportion to the square of the volume flowing through the element M. This depression is further reduced by the compression of spring $d$ and creates a suction above the piston $n$ which gives a closing action on valve $u$. The apparatus then regulates as in the previous case, for regulation of large suctions.

If the volumes to be handled are small, multiplied pressure variation is produced above piston $n$ by the previously described action of piston $i$, together with a small flow of steam through valve 4, passing through valve $k$ to atmosphere through valve 3.

Under certain other conditions a compounded pressure can be maintained at Q for which purpose the apparatus is adjusted first so as to maintain a large constant pressure as above described, and, second, by opening valves 12, 7 and 1, which causes the suction in Venturi element N to produce a downward force of piston $i$, increasing with the volume flowing through the Venturi element N. This downward pressure of piston $i$ increases the closing pressure of unbalanced valve $k$ which, in turn, increases the pressure above piston $n$, adding opening action to valve $u$ so that for equilibrium of valve $u$ and piston $n$, the increased pressure in Q becomes necessary to oppose the above opening action, which pressure is communicated through valves 13 and 10 to the lower portion of cylinder $m$ to exert a lifting action on piston $n$.

It will be apparent that to maintain a constant large steam pressure in pipe K all hand valves are closed with the exception of 15, 10, 3, 2 and 1, so that steam from pipe K passes through pipe J, valve 15, pipes C and G, valve 10 into the space below piston $n$, through the restricted passageway into the space above piston $n$ and out through unbalanced valve $k$ and valve 3 to atmosphere. The operation will then be as already described, the pressure maintained in K being determined by the adjustment of spring $d$.

Small pressures in steam pipe K may be regulated by operating the valves necessary to bring piston $i$ into operation and admitting a small supply of steam into the space above piston $n$. Similarly to the cases already described the steam pressure on the pressure side of valve $u$ can be regulated by communicating it to cylinder $m$ through suitable valve operations when large pressure is involved or by communicating it to cylinder $h$ for small pressure differences, in conjunction with the admission of small quantity of steam through hand valve 4 into the space above piston $n$, the pressure maintained being in each case dependent upon the adjustment of spring $d$.

In a general way, the regulator when working on small pressures operates, first through the adjusting spring to subtract a certain constant amount from the small pressure, leaving the remaining element of pressure to include all the variations and apply this pressure to the small unbalanced valve "$k$", which reproduces in the regulating cylinder the variations in pressure multiplied by the relative areas of piston $i$ and valve $k$.

This may be summarized: The pressure to be regulated has subtracted a certain amount; the remainder, containing all variations, is multiplied and the multiplied pressure applied to the regulating piston in the control cylinder.

From the description of an embodiment of the invention it will be clear to those skilled in the art that the principles involved can be applied in many other ways. The direct opening and closing of valves $t_1$ $t_2$ for example is merely shown to represent a simple example of how the pressure responsive regulating element $n$ may cause a change in the pressure or volume of the gas which is to be regulated, and whether done directly as shown or through intermediate translating elements as where increased power is necessary, the principles of the invention sought to be protected obviously remain unchanged. The adjustable unbalanced valve $k$, supported off its seat by a gas current passing through it, in all cases provides the means for determining and automatically regulating the pressure or other property of the gas which is to be controlled.

I claim:

1. Apparatus of the character described, comprising in combination a regulating valve, pressure responsive means for actuating said valve, means for admitting an operating fluid continuously and at a restricted rate of flow to said actuating means, a relief valve subjected to the opening influence of the operating fluid escaping through it, and means for applying to said relief valve an opposed resilient force to obtain equilibrium of the opposed forces at a predetermined normal position of the relief valve.

2. Apparatus of the character described, comprising in combination a regulating valve, pressure responsive means for actuating said valve, means for admitting an operating fluid continuously and at a restricted rate of flow to said actuating means, a relief valve subjected to the opening influence of the operating fluid escaping through it, and adjustable means for applying to said relief valve an opposed resilient force to obtain equilibrium of the opposed forces at a predetermined normal position of the valve.

3. Apparatus of the character described, comprising in combination a pressure regulating valve, pressure responsive means for actuating said valve, means for admitting an operating fluid continuously and at a restricted rate of flow to said actuating means, a relief valve subjected to the opening influence of the operating fluid escaping through it, and means exposed to the regulated pressure for applying to said relief valve an opposed resilient force to obtain equilibrium of the relief valve at a predetermined normal regulated pressure.

4. Apparatus of the character described, comprising in combination a pressure regulating valve, pressure responsive means for actuating said valve, means for admitting an operating fluid continuously and at a restricted rate of flow to said actuating means, a relief valve subjected to the opening influence of the operating fluid escaping through it and adjustable means exposed to the regulated pressure for applying to said relief valve an opposed resilient force to obtain equilibrium of the relief valve at a predetermined normal regulated pressure.

5. Apparatus of the character described, comprising in combination a pressure regulating valve, pressure responsive means for actuating said valve, means for admitting an operating fluid continuously and at a restricted rate of flow to said actuating means, a relief valve subjected to the opening influence of the operating fluid escaping through it, and multiplying means exposed to the regulated pressure for applying to said relief valve an opposed resilient force to obtain equilibrium of the relief valve at a predetermined normal regulated pressure.

6. Apparatus of the character described, comprising in combination a pressure regulating valve, pressure responsive means for actuating said valve, means for admitting an operating fluid continuously and at a restricted rate of flow to said actuating means, a relief valve subjected to the opening influence of the operating fluid escaping through it, and adjustable multiplying means exposed to the regulated pressure for applying to said relief valve an opposed resilient force to obtain equilibrium of the relief valve at a predetermined normal regulated pressure.

7. A device of the character described, comprising in combination a pressure regulator element, means for resiliently and cumulatively opposing its movement from an assumed normal position, means for leading a pressure gas continuously through the said regulator element to apply opposing gas pressures thereon, and an outlet control member for directly relieving one of the opposed pressures; said outlet control member being held open a variable extent by and proportionately to the pressure to be regulated.

8. A device of the character described, comprising in combination a pressure regulator element, adjustable means for resiliently and cumulatively opposing its movement from an assumed normal position, means for leading a pressure gas continuously through the said regulator element to apply opposing gas pressures thereon, and an outlet control member for directly relieving one of the opposed pressures; said outlet control member being held open a variable extent by and proportionately to the pressure to be regulated.

9. A device of the character described, comprising in combination a pressure regulator element, means for resiliently and cumulatively opposing its movement from an assumed normal position, means for leading a pressure gas continuously through the said regulator element to apply opposing gas pressures thereon, and an outlet control member for directly relieving one of the opposed pressures; said outlet control member being held open a variable extent by and proportionately to the pressure which it relieves.

10. A device of the character described, comprising in combination a pressure regulator element, adjustable means for resiliently and cumulatively opposing its movement from an assumed normal position means for leading a pressure gas continuously through the said regulator element to apply opposing gas pressures thereon, and an outlet control member for directly relieving one of the opposed pressures; said outlet control member being held open a variable extent by and proportionately to the pressure which it relieves.

CHARLES H. SMOOT.